(12) United States Patent
Batten et al.

(10) Patent No.: US 6,260,189 B1
(45) Date of Patent: Jul. 10, 2001

(54) COMPILER-CONTROLLED DYNAMIC INSTRUCTION DISPATCH IN PIPELINED PROCESSORS

(75) Inventors: Dean Batten, Allentown; Paul Gerard D'Arcy, Harleysville; C. John Glossner, Allentown; Sanjay Jinturkar; Jesse Thilo, both of Bethlehem, all of PA (US); Stamatis Vassiliadis, Pijnacker (NL); Kent E. Wires, Phillipsburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/152,744

(22) Filed: Sep. 14, 1998

(51) Int. Cl.[7] ........................................................ G06F 9/44
(52) U.S. Cl. ....................................................... 717/6
(58) Field of Search .............................. 717/6; 712/214, 712/205, 23, 215, 216, 217

(56) References Cited

U.S. PATENT DOCUMENTS

| | | | | |
|---|---|---|---|---|
| 5,488,729 | * | 1/1996 | Vegesna et al. | 712/209 |
| 5,630,157 | * | 5/1997 | Dwyer, III | 712/23 |
| 5,640,588 | * | 6/1997 | Vegesna et al. | 712/23 |
| 5,708,837 | * | 1/1998 | Handlogten | 712/23 |
| 5,881,308 | * | 3/1999 | Dwyer, III | 712/23 |
| 5,884,060 | * | 3/1999 | Vegesna et al. | 712/215 |
| 5,983,335 | * | 11/1999 | Dwyer, III | 712/23 |
| 5,996,060 | * | 11/1999 | Mendelson et al. | 712/205 |
| 6,112,019 | * | 8/2000 | Chamdani et al. | 395/390 |

OTHER PUBLICATIONS

D.A. Patterson and J.L. Hennessy, "Computer Architecture: A Quantitative Approach," Second Edition, Morgan Kaufmann, San Francisco, CA, pp. 240–261, 1996.

* cited by examiner

*Primary Examiner*—Mark R. Powell
*Assistant Examiner*—Todd Ingberg
(74) *Attorney, Agent, or Firm*—Ryan, Mason & Lewis, LLP

(57) ABSTRACT

The invention provides techniques for improving the performance of pipelined processors by eliminating unnecessary stalling of instructions. In an illustrative embodiment, a compiler is used to identify pipeline dependencies in a given set of instructions. The compiler then groups the set of instructions into a code block having a field which indicates the types of pipeline dependencies, if any, in the set of instructions. The field may indicate the types of pipeline dependencies by specifying which of a predetermined set of hazards arise in the plurality of instructions when executed on a given pipelined processor. For example, the field may indicate whether the code block includes any Read After Write (RAW) hazards, Write After Write (WAW) hazards or Write After Read (WAR) hazards. The code block may include one or more dynamic scheduling instructions, with each of the dynamic scheduling instructions including a set of instructions for execution in a multi-issue processor.

24 Claims, 3 Drawing Sheets

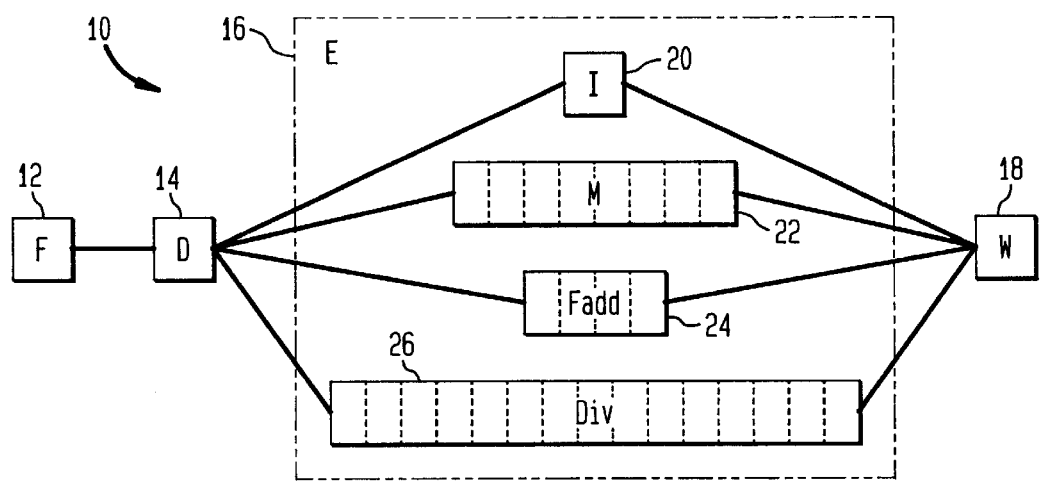

FIG. 6
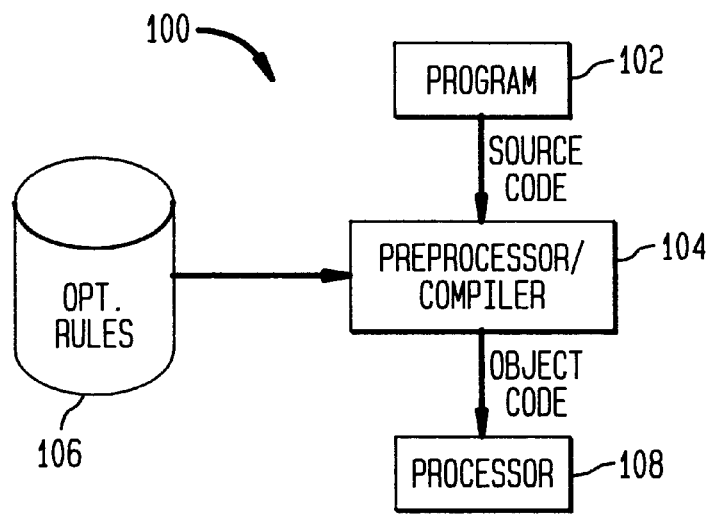
FIG. 7
| tag | opcode | numInstr | dtype | rsv |
FIG. 8
| p | WAR | WAW | RAW | INFORMATION |
|---|-----|-----|-----|-------------|
| 0 | 0 | 0 | 0 | RESERVED |
| 0 | 0 | 0 | 1 | NO RAW'S |
| 0 | 0 | 1 | 0 | NO WAW'S |
| 0 | 1 | 0 | 0 | NO WAR'S |
| 0 | 0 | 1 | 1 | NO WAW'S, NO RAW'S |
| 0 | 1 | 1 | 0 | NO WAR'S, NO WAW'S |
| 0 | 1 | 0 | 1 | NO WAR'S, NO RAW'S |
| 0 | 1 | 1 | 1 | NO DATA HAZARDS |
| 1 | 1 | 1 | 1 | NO DATA HAZARDS, NO PREDICATION HAZARDS |

FIG. 9

```
ccdd (! WAR, ! WAW) { r9 = r9 + r4;
    s5 = s5 + s3;
    s3 = s5 * s4;   // this is a RAW hazard

```
ccdd (! RAW, ! WAW, ! WAR) { r9 = r9 + r4;
    s5 = s5 + s3;
    t7 = t7 * t4;

```
ccdd (! RAW, ! WAW, ! WAR, ! pred) {

```
ccdd (! RAW, ! WAW, ! WAR, ! pred) {

(p1==0) ccds (00000) [I₁ I₂ I₃ ...];
    (p3==0) ccds (00100) [Iₐ I_b I_c ...];
               ⋮
    (p2==1) ccds (00000) [I_A I_B I_C ...];

}
```

COMPILER-CONTROLLED DYNAMIC INSTRUCTION DISPATCH IN PIPELINED PROCESSORS

FIELD OF THE INVENTION

The present invention relates generally to microprocessors and other types of digital data processors, and more particularly to digital data processors which utilize pipelined processing techniques.

BACKGROUND OF THE INVENTION

Modern processors are often pipelined, meaning that execution of each instruction is divided into several stages. FIG. 1 shows a functional block diagram of a conventional pipelined processor 10. This exemplary pipelined processor includes four stages: a fetch (F) stage 12, a decode (D) stage 14, an execute (E) stage 16, and a writeback (W) stage 18. Pipelined processors such as processor 10 may be register-based, i.e., other than for load or store instructions, the source(s) and destination(s) of each instruction are registers. The fetch unit 12 retrieves a given instruction from an instruction memory. The decode stage 14 reads the source register(s) of the instruction, and the writeback stage 18 writes to the destination register(s) of the instruction. In the execute stage 16, the instruction is executed by one of four specialized execution units, for each of which the number of cycles is denoted by the number of boxes: a 1-cycle integer (I) unit 20, an 8-cycle integer/floating point multiplier (M) 22, a 4-cycle floating point adder (Fadd) 24, or a 15-cycle integer/floating point divider (Div) 26. The execution units in this example are fully pipelined, i.e., can accept a new instruction on every clock cycle. These specialized units are used to execute particular types of instructions, and each of the units may have a different latency. An instruction is said to be "dispatched" when it has completed register read in the decode stage 14 and begun execution in the execution stage 16. In other words, a dispatch takes place when an instruction passes from the decode stage 14 to one of the execution units in execution stage 16.

A significant problem with conventional pipelined processors such as processor 10 of FIG. 1 is that the use of a pipeline introduces data hazards which are not present in the absence of a pipeline, because results of previous instructions may not be available to a subsequent instruction. This is often attributable to the different latencies of the various execution units in the processor. Types of data hazards which can arise in conventional pipelined processors include, for example, Read After Write (RAW) data hazards, Write After Write (WAW) data hazards, and Write After Read (WAR) data hazards.

FIG. 2 illustrates an exemplary RAW data hazard, showing how the pipelined processor 10 of FIG. 1 executes sub instructions $I_1$ and $I_2$ for processor clock cycles 1 through 5. Instruction $I_1$ subtracts the contents of its source registers $r_2$ and $r_3$ and writes the result to its destination register $r_1$. Instruction $I_2$ subtracts the contents of its source registers $r_5$ and $r_1$, and writes the result to its destination register $r_4$. It can be seen that, unless otherwise prevented, the instruction $I_2$ in the conventional processor 10 will read register $r_1$ in clock cycle 3, before the new value of $r_1$ is written by instruction $I_1$, resulting in a RAW data hazard. In a non-pipelined processor, the instructions as shown in FIG. 2 would not create a hazard, since instruction $I_1$ would be completed before the start of instruction $I_2$.

FIG. 3 illustrates an exemplary WAW data hazard, arising when the processor executes instructions $I_1$ and $I_2$ for processor clock cycles 1 through 11. Instruction $I_1$ multiplies the contents of its source registers $r_2$ and $r_3$ and writes the result to its destination register $r_4$. Instruction $I_2$ subtracts the contents of its source registers $r_6$ and $r_8$ and writes the result to destination register $r_4$. It can be seen that, unless otherwise prevented, instruction $I_2$ in the conventional pipelined processor will write to register $r_4$ in clock cycle 5, before instruction $I_1$, and then $I_1$ will incorrectly overwrite the result of $I_2$ in register $r_4$ in clock cycle 11. This type of hazard could arise if, for example, instruction $I_1$ were issued speculatively by a compiler for a branch which was statically mispredicted between $I_1$ and $I_2$. In the case of in-order instruction completion, instruction $I_1$ will not affect the outcome, since in-order completion will discard the result of $I_1$. However, as described above, the hazard is significant in the presence of out-of-order instruction completion.

A WAR hazard occurs, e.g., when register reads are allowed to be performed during later stages and register writes are allowed to be performed in the earlier stages in the pipeline. The exemplary four-stage pipelined processor 10 of FIG. 1 is thus incapable of producing a WAR hazard, but such hazards can arise in other pipelined processors. FIG. 4 illustrates an exemplary WAR data hazard arising in a five-stage pipelined processor including stages A, $W_1$, B, $R_1$ and C. In this processor, stages A, B and C are generic pipeline stages, stage $W_1$ writes an intermediate result to a destination register, and stage $R_1$ reads the source registers for processing in stage C. The processor executes instructions $I_1$ and $I_2$ for processor clock cycles 1 through 6. Instruction $I_1$ applies an operation op1 to the contents of its source registers $r_2$ and $r_3$ and writes the result to its destination register $r_1$. Instruction $I_2$ applies an operation op2 to the contents of its source registers $r_4$ and $r_5$ and writes the result to destination register $r_3$. Note that an intermediate result is written to destination register $r_3$ in the $W_1$ stage of $I_2$ before the intended value of $r_3$ can be read in the $R_1$ stage of $I_1$, thereby introducing a WAR hazard.

Predicated instructions also can present a problem for pipelined processors. For example, the processor hardware generally must check the validity of the predicate used for each instruction before it can determine whether or not the instruction should be executed. FIG. 5 shows an example of a predication hazard which can arise in the conventional four-stage pipelined processor 10 of FIG. 1. The processor executes instructions $I_1$ and $I_2$ for processor clock cycles 1 through 5. The instruction $I_1$ is a setpred operation which sets the predicate p1 to a value of 0. It will be assumed that the predicate p1 is true, i.e., has a value of 1, before execution of this instruction. The instruction $I_2$ is a predicated instruction which, if the predicate p1 is true, performs an add operation using source registers $r_2$ and $r_3$ and destination register $r_1$. Note that $I_2$ will be executed in this example even though p1 should be false at the point that $I_2$ dispatches, thereby introducing a predication hazard. $W_p$ and $W_d$ in FIG. 5 represent writeback stages to predication and data registers, respectively. It should be noted that predication hazards, like data hazards, can also be grouped into RAW, WAW or WAR hazards.

When using pipelined processors having multiple execution units with different latencies, it is generally necessary to control the dispatch of instructions so as to ensure proper program execution, i.e., so as to avoid the above-described data and predication hazards. A conventional method, known as pipeline interlock, determines the latency of each instruction and stalls the dispatch of subsequent instructions until the latencies are resolved. However, this method often leads to performance degradation, since consecutive instructions are not guaranteed to have interdependence, and thus need not always be stalled. In addition, this method and other conventional approaches can require unduly complex bypass checking hardware or register renaming hardware.

SUMMARY OF THE INVENTION

The invention provides techniques for improving the performance of pipelined processors by, for example, eliminating unnecessary stalling of instructions. These techniques are referred to herein as compiler controlled dynamic dispatch, or CCDD. In an illustrative embodiment, a compiler is used to identify pipeline dependencies and their corresponding hazards in blocks of program code at compile time. If no hazards are detected in a given block, the instructions within that block can be executed without stalls or other corrective measures. If one or more hazards are detected in the given code block, the hazard types are specified in a pipeline dependency type field associated with that code block, such that the particular types of hazards can be corrected, for example, through appropriate instruction stalls. The pipeline dependency type field may indicate, for example, whether the code block includes Read After Write (RAW) hazards, Write After Write (WAW) hazards, Write After Read (WAR) hazards or predication hazards. The invention ensures that the processor implements only those stalls or other corrective measures that are required for hazards actually present in a given block of code, thereby avoiding the performance degradations which can result when using conventional techniques.

An exemplary CCDD instruction in accordance with the invention may include the above-noted pipeline dependency type field, as well as other fields such as, for example, an operation code field and a "number of instructions" field. The pipeline dependency type field may be configured to include, for example, four bits, with a given one of the bits used to indicate the presence of a corresponding one of a RAW hazard, a WAW hazard, a WAR hazard and a predication hazard. As another example, the pipeline dependency type field may include six bits, with a given one of the bits used to indicate the presence of a corresponding one of a RAW data hazard, a WAW data hazard, a WAR data hazard, a RAW predication hazard, a WAW predication hazard, and a WAR predication hazard. The operation code field identifies the code block as corresponding to a CCDD instruction, and the "number of instructions" field specifies the number of instructions in the code block.

Compiler controlled dynamic dispatch in accordance with the invention allows a compiler to reduce the number of instruction stalls that can arise due to execution unit latencies in a pipelined processor. The invention can significantly decrease the execution time of a given program, as well as the amount of required checking and renaming hardware, with only a minimal increase in code size and complexity. In addition, the invention can be made semantically transparent to the executing program, and can be implemented using a single instruction that, for example, effectively enables or disables hardware pipeline checking to reduce unnecessary stalling. Moreover, the invention can be used in conjunction with compiler-controlled dynamic scheduling (CCDS) on multi-issue processors, and in a wide variety of other processing applications. These and other features and advantages of the present invention will become more apparent from the accompanying drawings and the following detailed description.

BRIEF DESCRIPTION OF THE DRAWINGS

FIG. 1 is a functional block diagram of a conventional pipelined processor.

FIGS. 2 through 5 illustrate data and predication hazards which can arise in the conventional pipelined processor of FIG. 1.

FIG. 6 is a block diagram of an exemplary processing system in which the invention may be implemented.

FIG. 7 shows an example of an instruction used to implement compiler-controlled dynamic dispatch in accordance with an illustrative embodiment of the invention.

FIG. 8 shows a possible implementation of a pipeline dependency type field in the exemplary instruction of FIG. 7.

FIGS. 9 through 12 show code blocks used to implement compiler-controlled dynamic dispatch in accordance with an illustrative embodiment of the invention.

DETAILED DESCRIPTION OF THE INVENTION

The invention will be illustrated below in conjunction with exemplary pipelined processors and processing systems. It should be understood, however, that the invention is more generally applicable to any processor or processing system in which it is desirable to provide compiler-controlled dispatch of instructions so as to avoid data hazards, predication hazards, or other similar problems. The term "processor" as used herein is intended to include any device in which instructions retrieved from a memory or other storage element are executed using one or more execution units. Exemplary processors in accordance with the invention may therefore include, for example, microprocessors, central processing units (CPUs), very long instruction word (VLIW) processors, single-issue processors, multi-issue processors, digital signal processors, application-specific integrated circuits (ASICs), personal computers, mainframe computers, network computers, workstations and servers, and other types of data processing devices, as well as portions and combinations of these and other devices. The term "compiler" is intended to include any software program or other device which processes code of a particular level, e.g., source code, to generate corresponding code of a lower level, e.g., object code or executable code. A compiler may therefore be implemented as a device which also performs other non-compiler functions, for example, as a preprocessor/compiler, or as a stand-alone device. A "code block" refers generally to a set of one or more instructions. The term "pipeline dependency" as used herein is intended to include any dependency which may give rise to a data hazard, a predication hazard, or any other type of hazard or similar occurrence in a processor. This is to be distinguished from an architectural dependency, as described in U.S. patent application Ser. No. 08/997,117 filed Dec. 16, 1997 in the names of inventors Paul G. D'Arcy, C. John Glossner, Sanjay Jinturkar and Stamatis Vassiliadis, and entitled "Compiler Controlled Dynamic Scheduling of Program Instructions," which is incorporated by reference herein. An architectural dependency generally does not give rise to a hazard but instead places constraints on the order of execution of delimited instructions so that proper program order may be preserved. A given pipeline dependency may be identified by the type of hazard that it produces, e.g., a pipeline dependency may be referred to as a RAW, WAW or WAR dependency, if it gives rise to a RAW, WAW or WAR hazard, respectively. An indication of type of pipeline dependency may therefore be implemented as an indication of the possible corresponding type of hazard. Depending upon the implementation of a particular pipeline, a given pipeline dependency may or may not produce a hazard in that pipeline.

The present invention avoids the problems associated with the above-noted data and predication hazards by providing a technique referred to as "compiler controlled dynamic dispatch" or CCDD. In an illustrative embodiment of the invention, a compiler encapsulates a block of instructions into a CCDD instruction which also specifies the data and predication hazards that are present in the code block. The compiler in the illustrative embodiment is able to determine all register, address and predicate pipeline dependencies, and thus all data and predication hazards, in a given code block. The instructions in the given code block are therefore executed using only those stalls, if any, that may be necessary to protect against the hazards actually present in that block. If the block does not contain any pipeline dependencies giving rise to a hazard, the instructions in that block may be executed serially without any processor check or stalls. The invention thus improves instruction execution in pipelined processors by eliminating unnecessary stalls.

FIG. 6 shows a simplified block diagram of an exemplary processing system 100 in which the invention may be implemented. In the system 100, a program 102 provides source code as an input to a preprocessor/compiler 104. The preprocessor/compiler 104 performs both a preprocessing function and a compiler function in the illustrative embodiment of FIG. 1. Alternatively, the system 100 could include, e.g., a separate preprocessor and a separate compiler, or only a compiler. The preprocessor/compiler 104 processes the source code of the program 102 to identify pipeline dependencies which can lead to the previously-described data or predication hazards. The source code generally includes instructions configured in accordance with an instruction set architecture (ISA). A set of optimization rules 106 are used by the preprocessor/compiler 104 in the processing of the source code. The preprocessor/compiler 104 uses the optimization rules 106 to generate, from the source code of program 102, corresponding object code which may be executed by a processor 108. Conventional operations performed by the preprocessor/compiler 104 are described in, for example, A. Aho et al., Compilers: Principles, Techniques and Tools, Addison-Wesley, 1988, which is incorporated by reference herein. Processor 108 may be a pipelined processor, such as processor 10 of FIG. 1, or any other suitable processor. Another exemplary processor suitable for use as processor 108 in system 100 is described in greater detail in the above-cited U.S. patent application Ser. No. 08/997,117 filed Dec. 16, 1997.

FIG. 7 shows the format of an exemplary CCDD instruction which may be utilized in the system 100 of FIG. 6 in accordance with the invention. The CCDD instruction may be part of an ISA supported by the system 100. In this example, the CCDD instruction shown in FIG. 7 is assumed to be an instruction issued by a compiler, such as preprocessor/compiler 104, at compile time. The CCDD instruction encapsulates a code block, and indicates what types of hazards, if any, occur within the block. It includes a tag field, an opcode field, a numInstr field, a dtype field and a rsv field. The tag and opcode fields are used within a specific implementation to identify the CCDD instruction, and the rsv field is reserved for use in implementing other, possibly unrelated, functions. The numInstr field specifies the number of subsequent instructions in the program 102 that are to be included within the block of code corresponding to the CCDD instruction. The dtype field is used to specify the type of pipeline dependencies, and thus the types of hazards, that occur within the corresponding block of code. Other fields may also be used as needed in a given application.

FIG. 8 shows a possible implementation of the dtype field in the CCDD instruction of FIG. 7. In this implementation, the dtype field includes four bits, with a given one of the bits used to indicate the presence of a corresponding WAR, WAW, RAW or predication (p) hazard. A bit with a value 0 indicates that a pipeline dependency producing the corresponding hazard is present in the code block, while a bit with a value 1 indicates that a pipeline dependency producing the corresponding hazard is not present in the code block. For example, a dtype field with a value "1111" indicates that there are no pipeline dependencies giving rise to data and predication hazards, and thus no data and predication hazards, in the corresponding code block. A processor which receives CCDD instructions of this type from a compiler can be configured in a straightforward manner to provide only the necessary instruction stalls for the various code blocks. Suitable processor configurations for use with the invention will be apparent to those of ordinary skill in the art, and are therefore not described in detail herein.

As noted previously, predication hazards, like data hazards, can also be grouped into RAW, WAW or WAR hazards. One possible alternative to the exemplary implementation of the dtype field shown in FIG. 8 could therefore include, for example, six bits of information for identifying the types of hazards which are present in the corresponding code block. In this alternative, a single one of the six bits is used to indicate the presence or absence of either a RAW data hazard, a WAW data hazard, a WAR data hazard, a RAW predication hazard, a WAW predication hazard or a WAR predication hazard in the code block. Of course, many other alternative implementations of the dtype field may be used, and will be readily apparent to those skilled in the art.

The manner in which compiler controlled dynamic dispatch in accordance with the invention avoids hazards will now be described in greater detail. In the illustrative embodiment, a compiler, e.g., the preprocessor/compiler 104 of FIG. 6, is configured to detect specific instances of pipeline dependencies giving rise to RAW, WAW and WAR hazards within a given block of code in a program, e.g., program 102. The compiler then encapsulates the code block into a CCDD instruction. The CCDD instruction specifies the types of pipeline dependencies within the code block that may result in hazards, if there are any such dependencies within the block. The processor hardware, e.g., processor 108, can then use this information to eliminate the stalls in dispatch associated with any pipeline dependencies that do not occur within the block. For example, if there are no pipeline dependencies present in the block, all associated stalls can be avoided.

FIG. 9 shows an example of a multi-instruction code block which includes a RAW data hazard resulting from the instruction "s3=s5*s4." This encapsulated code block includes an indicator, illustrated in this example by a code block header "ccdd(!WAR, !WAW)" which specifies that the corresponding block does not include any WAR or WAW data hazards. Since there is only a RAW hazard in this code block, all stalls associated with potential WAR and WAW hazards can be eliminated. The headers in the examples of FIGS. 9, 10, 11 and 12 represent high level code which illustrates the encapsulation of a given code block. This high level code may be translated to actual CCDD instructions of the type shown in FIG. 7. Many other types of code can also be used to implement the invention.

FIG. 10 shows an example of a multi-instruction code block which does not include any data dependencies, and thus no data hazards. This encapsulated code block includes a code block header "ccdd(!RAW, !WAR, !WAR)" which specifies that the corresponding block does not include any RAW, WAR or WAR data hazards. As a result, the instructions in this code block can be executed serially without any stalls.

Compiler controlled dynamic dispatch in accordance with the invention can also handle predication hazards, in a manner similar to that in which it handles data hazards. FIG. 11 shows an example of an encapsulated code block which includes a number of predicated instructions. These instructions are the same instructions shown in FIG. 10, but with a predicate included before each instruction. In this example, there are no predication hazards in the predicated instructions. The encapsulated code block in FIG. 11 therefore includes a header "ccdd(!RAW, !WAR, !WAR, !pred)" which specifies that there are no data hazards or predication hazards in the code block. The instructions can therefore execute serially without any stalls.

The compiler controlled dynamic dispatch techniques of the invention can be used in conjunction with a technique known as compiler controlled dynamic scheduling (CCDS), which may be used, e.g., to schedule instructions in a multi-issue processor. This is an example of an application in which CCDD in accordance with the invention can be implemented on a multi-issue processor. The compiler in this case may, for example, treat a given CCDS block as a single instruction and check for hazards in substantially the same manner as in the case of a single-issue processor. CCDS is described in greater detail in the above-cited U.S. patent application Ser. No. 08/997,117 filed Dec. 16, 1997.

FIG. 12 shows an example of application of the CCDD techniques of the invention to CCDS. The encapsulated code block in this example includes a number of predicated CCDS blocks, designated ccds(00000), ccds(00100), . . . ccds(00000), which include sets of instructions $[I_1, I_2, I_3 . . . ]$, $[I_a, I_b, I_c . . . ]$, . . . $[I_A, I_B, I_C . . . ]$, respectively. As previously noted, each CCDS block, even though it includes multiple instructions, is treated as a single instruction for purposes of CCDD. The CCDD header for this code block is "ccdd(!RAW, !WAR, !WAR, !pred)," which specifies that the block does not include any data or predication hazards. The instructions in the block may therefore be executed serially without any stalls.

It should be noted that CCDD in accordance with the invention is generally semantically transparent to the executing program. In other words, the program produces the same result whether the CCDD techniques of the invention are utilized or not. However, without use of CCDD, and if hardware for detecting hazards is not provided, a processor generally must stall conservatively, resulting in a longer execution time.

The examples described in conjunction with FIGS. 8 through 12 assume that all instructions produce hazards unless the dtype field for the corresponding code block indicates otherwise. This exemplary approach ensures that there is no need for bypass checking logic or other similar circuitry in the processor. In addition, this approach does not preclude superscalar implementations, and may allow reduced complexity register renaming hardware, e.g., for WAW and WAR hazards. Moreover, the approach in the examples of FIGS. 8 through 12 can ensure that the resulting code is portable from one processor to another. As the FIG. 9 example shows, CCDD in the illustrative embodiment is conservative; although pipelined processors with single-cycle latencies could execute the instructions in this example without a stall, pipelined processors with longer latencies would encounter a RAW hazard, and therefore the CCDD instruction specifies RAW hazards.

Compiler controlled dynamic dispatch in accordance with the invention allows a compiler to reduce the number of instruction stalls that can arise due to variation in execution unit latencies in a pipelined processor. In the illustrative embodiment, the compiler detects data and predication hazards at compile time, and the processor then uses this information to control instruction dispatch effectively. The invention can be used in conjunction with CCDS instructions to further improve performance. The invention can be made semantically transparent to the executing program, and can be implemented using a single instruction that effectively enables or disables hardware pipeline checking to reduce unnecessary stalling and thereby improve performance.

The present invention may be configured to meet the requirements of a variety of different processing applications and environments, using any desired type of pipelining and any type of processor. For example, instead of treating data and predication hazards separately as in the illustrative embodiments, these and other types of hazards could be dealt with together by, e.g., including fields for base address registers and control registers in a given CCDD instruction. It should also be noted that the invention may be implemented at least in part in software, e.g., using a machine-readable medium, such as an electronic memory or a magnetic or optical disk containing one or more programs which, when executed in a computer or other processor, provide the CCDD functions described herein. The above-described embodiments of the invention are therefore intended to be illustrative only. Numerous alternative embodiments within the scope of the following claims will be apparent to those skilled in the art.

What is claimed is:

1. A method of processing instructions in a processing system, the method comprising the steps of:

identifying pipeline dependencies in a plurality of instructions; and grouping the plurality of instructions into a code block having a field associated therewith which indicates the types of pipeline dependencies, if any, in the plurality of instructions;

wherein the identifying and grouping steps are implemented in a compiler of the system and carried out in conjunction with compilation of the instructions, and the field of the code block is used to control application of subsequent hardware-based dependency checking in a processor of the system.

2. The method of claim 1 wherein the identifying step includes identifying hazards resulting from the pipeline dependencies, and further wherein the field indicates the types of pipeline dependencies at least in part by specifying which of a predetermined set of hazards arise in the plurality of instructions.

3. The method of claim 2 wherein the hazards include at least one of a Read After Write (RAW) hazard, a Write After Write (WAW) hazard, a Write After Read (WAR) hazard and a predication hazard.

4. The method of claim 1 wherein the field includes four bits, with a given one of the bits used to indicate the presence of a corresponding one of a RAW data hazard, a WAW data hazard, a WAR data hazard and a predication hazard.

5. The method of claim 1 wherein the field includes six bits, with a given one of the bits used to indicate the presence of a corresponding one of a RAW data hazard, a WAW data hazard, a WAR data hazard, a RAW predication hazard, a WAW predication hazard, and a WAR predication hazard.

6. The method of claim 1 wherein a given bit in the field having a first value indicates that the corresponding hazard is present in the code block, and the given bit having a second value indicates the corresponding hazard is not present in the code block.

7. The method of claim 1 wherein the code block includes a plurality of dynamic scheduling instructions, each of the dynamic scheduling instructions including a plurality of instructions for execution in a multi-issue processor.

8. The method of claim 1 wherein the grouping step further includes associating an instruction with the code block, and wherein the instruction includes the field.

9. The method of claim 8 wherein the instruction further includes an operation code field identifying the code block as a particular type of instruction, and a number of instructions field specifying the number of instructions in the code block.

10. An apparatus for processing instructions in a processing system, the apparatus comprising:
a compiler operative to identify pipeline dependencies in a plurality of instructions, and to group the plurality of instructions into a code block having a field associated therewith which indicates the types of pipeline dependencies, if any, in the plurality of instructions; and
a processor operative to execute the instructions in the code block;
wherein the identify and group operations of the compiler are carried out in conjunction with compilation of the instructions, and the field of the code block is used to control application of subsequent hardware-based dependency checking in the processor.

11. The apparatus of claim 10 wherein the compiler identifies hazards resulting from the pipeline dependencies, and further wherein the field indicates the types of pipeline dependencies at least in part by specifying which of a predetermined set of hazards arise in the plurality of instructions.

12. The apparatus of claim 11 wherein the hazards include at least one of a RAW hazard, a WAW hazard and a WAR hazard.

13. The apparatus of claim 10 wherein the field includes four bits, with a given one of the bits used to indicate the presence of a corresponding one of a RAW data hazard, a WAW data hazard, a WAR data hazard and a predication hazard.

14. The apparatus of claim 10 wherein the field includes six bits, with a given one of the bits used to indicate the presence of a corresponding one of a RAW data hazard, a WAW data hazard, a WAR data hazard, a RAW predication hazard, a WAW predication hazard, and a WAR predication hazard.

15. The apparatus of claim 10 wherein a given bit in the field having a first value indicates that the corresponding hazard is present in the code block, and the given bit having a second value indicates the corresponding hazard is not present in the code block.

16. The apparatus of claim 10 wherein the code block includes a plurality of dynamic scheduling instructions, each of the dynamic scheduling instructions including a plurality of instructions for execution in a multi-issue processor.

17. The apparatus of claim 10 wherein the compiler is further operative to associate an instruction with the code block, and wherein the instruction includes the field.

18. The apparatus of claim 17 wherein the instruction further includes an operation code field identifying the code block as a particular type of instruction, and a number of instructions field specifying the number of instructions in the code block.

19. A machine-readable medium containing one or more programs which when executed in a processing system implement the steps of:
identifying pipeline dependencies in a plurality of instructions; and
grouping the plurality of instructions into a code block having a field associated therewith which indicates the types of pipeline dependencies, if any, in the plurality of instructions;
wherein the identifying and grouping steps are implemented in a compiler of the system and carried out in conjunction with compilation of the instructions and the field of the code block is used to control application of subsequent hardware-based dependency checking in a processor of the system.

20. The machine-readable medium of claim 19 wherein the one or more programs implement the step of identifying hazards resulting from the pipeline dependencies, wherein the field indicates the types of pipeline dependencies at least in part by specifying which of a predetermined set of hazards arise in the plurality of instructions.

21. The machine-readable medium of claim 20 wherein the hazards include at least one of a RAW hazard, a WAW hazard and a WAR hazard.

22. A method of processing instructions in a processing system, the method comprising the steps of:
identifying at least one hazard associated with a plurality of instructions to be executed on a pipelined processor; and
grouping the plurality of instructions into a code block having a field associated therewith which includes and indicator of the hazard;
wherein the identifying and grouping steps are implemented in a compiler of the system and carried out in conjunction with compilation of the instructions, and the field of the code block is used to control application of subsequent hardware-based dependency checking in the processor.

23. An apparatus for processing instructions in a processing system, the apparatus comprising:
a pipelined processor; and
a compiler operative to identify at least one hazard associated with a plurality of instructions to be executed on the pipelined processor, and to group the plurality of instructions into a code block having a field associated therewith which includes an indicator of the hazard;
wherein the identify and group operations of the compiler are carried out in conjunction with compilation of the instructions, and the field of the code block is used to control application of subsequent hardware-based dependence checking in the processor.

24. A machine-readable medium containing one or more programs which when executed in a processing system implement the steps of:
identifying at least one hazard associated with a plurality of instructions to be executed on a pipelined processor; and
grouping the plurality of instructions into a code block having a field associated therewith which includes an indicator of the hazard;
wherein the identifying and grouping steps are implemented in a compiler of the system and carried out in conjunction with compilation of the instructions, and the field of the code block is used to control application of subsequent hardware-based dependency checking in the processor.

* * * * *